Figure 1:
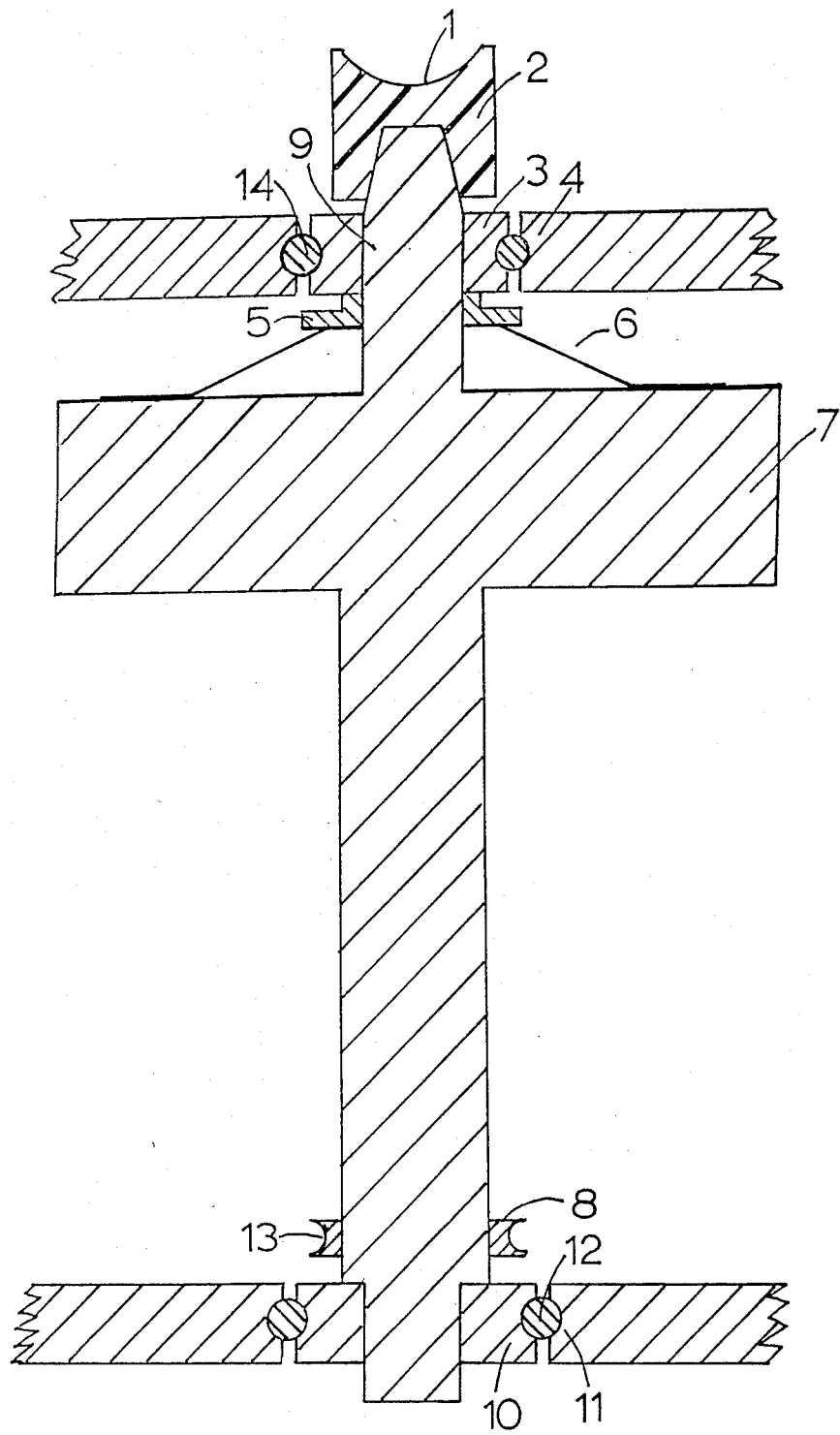

United States Patent [19]

Neefe et al.

[11] Patent Number: 4,607,428
[45] Date of Patent: Aug. 26, 1986

[54] METHOD FOR PRELOADING BEARINGS FOR A SPIN CASTING APPARATUS

[76] Inventors: Charles W. Neefe, Box 361 811 Scurry St.; Don R. Proctor, P.O. Box 429, both of, Big Spring, Tex. 79720

[21] Appl. No.: 742,949

[22] Filed: Jun. 10, 1985

Related U.S. Application Data

[63] Continuation-in-part of Ser. No. 642,114, Aug. 17, 1984, Pat. No. 4,534,915, which is a continuation-in-part of Ser. No. 506,873, Jul. 5, 1983, abandoned, which is a continuation-in-part of Ser. No. 417,641, Sep. 9, 1982, Pat. No. 4,416,837.

[51] Int. Cl.4 .............................................. B23P 11/00
[52] U.S. Cl. ................................ 29/436; 29/148.4 A; 29/149.5 R; 29/724

[58] Field of Search ................... 29/148.4 R, 148.4 A, 29/149.5 R, 434, 436, 724, 725; 264/1.1, 2.1, 311

[56] References Cited

U.S. PATENT DOCUMENTS 3,651,550  3/1972  Bennett .......................... 29/148.4 A Primary Examiner—Mark Rosenbaum
Assistant Examiner—Ronald S. Wallace

[57] ABSTRACT

A method of preloading the upper ball bearing of a spin casting machine. Spring force is used to lift the inner bearing race and preload the bearing upward. Spring force is applied against a bearing collar which rests against the lower surface of the inner bearing race. The rotor shaft has a sliding fit within the inner race and the bearing collar. The rotor shaft is frictionally coupled to the inner bearing race by the force of the preloading spring through the bearing collar.

3 Claims, 1 Drawing Figure

METHOD FOR PRELOADING BEARINGS FOR A SPIN CASTING APPARATUS

This application is a continuation-in-part of patent application Ser. No. 642,114 filed Aug. 17, 1984 entitled, "METHOD OF CONTROLLING THE ULTRAVIOLET POLYMERIZATION OF SPIN CAST LENSES", now U.S. Pat. No. 4,534,915 issued Aug. 13, 1985, which is a continuation-in-part of Ser. No. 506,873, filed July 5, 1983 entitled, "IMPROVEMENTS IN SPIN CASTING HYDROGEL LENSES", now abandoned, which is a continuation-in-part of Ser. No. 417,641 entitled "SIMPLIFIED IMPROVEMENTS IN SPIN CASTING" filed Sept. 9, 1982, now U.S. Pat. No. 4,416,837 issued Nov. 23, 1983.

PRIOR ART

Spin casting consists of polymerizing a suitable monomer composition in an open mold cavity having a concavely curved bottom surface and rotating about an upright axis transverse of that surface. There is obtained a shape-retaining polymer body having a convex bottom surface conforming to the mold surface, and a concave top surface which has the shape of a paraboloid formed by the rotation of the mold. By centrifugal force a change of curvature in the monomer is caused. The parabolic shape is distorted by the effect of surface tension whose magnitude approaches the effect of the centrifugal forces on the lens shape. The surface tension of a known polymerization mixture is constant and predictable at a fixed temperature, and the power of a lens is therefore predictable and reproducible.

The art of spin casting contact lenses has been in use for nineteen years. The principal value of spin casting is its low labor cost and high production. The disadvantages are the lenses are not spherical and the aspheric surface is of a shape that increases spherical aberration when in place on the eye. The exact shape of a spin cast surface is most difficult to describe due to its being formed by several forces including centrifugal force, surface tension, gravity and radius of the concave mold. Also the lens monomer undergoes changes during polymerization. These changes include shrinkage, increase in viscosity, gelation, exotherm and solidification. It is desirable to start polymerization at the center and proceed toward the edge. In spin casting the reverse has been true. The edge of the concave lens surface being slightly nearer the ultraviolet light source polymerizes before the central area.

STATE OF THE ART

The most simple case of the spinning surface occurs when the surface tension can be neglected. In this case the spinning surface is a paraboloid which in cylindrical coordinates (z,r) is described by the equation:

$$z = \frac{w^2 r^2}{2g}$$

$w = 2\pi n$, $n$ = spin speed, and $g$ = gravitational constant

Actual spin casting involves a combination of the static and spinning cases. The equation describing the spinning fluid surface contains separate terms relating to the stationary and spinning states:

$$z = \frac{w^2 r^2}{2g} + \frac{a}{pg} \left[ \frac{1}{R_1} + \frac{1}{R_2} \right]$$

$a$ = surface tension
$p$ = density
$R_1$ = radius of osculatory sphere at (r,z)
$R_2$ = radius of meriodional sphere at (r,z)

With the monomer formulation in the casting mold and the cover sealed, the motor is started and brought to the speed selected. The speed to be used is dependent upon the focal length of the paraboloid surface desired according to the formula:

$$f = \frac{g}{2w^2}$$

where the focal length is in m/m, the gravitational acceleration constant is in m/m/sec$^2$, and the rotational velocity is in radians/sec.

This formula may be developed by considering the forces acting on the liquid. A body of liquid lying at rest will form a surface normal to the force of gravity acting upon it. In the same manner, if a liquid is held in a container which is rotated about a vertical axis, a surface will be formed which is everywhere normal to the resultant force acting on each surface element.

It can be shown mathematically that when a liquid is revolved in a horizontal plane, the free surface takes the form of a paraboloid, a parabola of revolution. ("Fluid Mechanics," R. C. Binder, 3rd Edition, 1955, Prentice-Hall, New York). Moreover, it can further be shown that, since the equation of the parabola is:

$$y^2 = 4fx$$

the focal length f of the paraboloid so formed is a function of the speed of rotation. This can be expressed more simply by the following formula:

$$f = \frac{17.710}{N^2}$$

where N represents the rotational speed in revolutions per minute. The density and viscosity of the liquid rotated does not affect the focal length of the paraboloid.

Vibrations produced standing waves on the surface of the liquid lens monomer. This must not be allowed if optical surfaces are to be obtained. Large heavy machines anchored to concrete pillars have been used to reduce vibration.

Precise repeatable control of the rotational speed is required to control the lens refractive power.

The concave mold must also rotate about a stable center of rotation if true surfaces are to be obtained.

SUBJECT OF THE INVENTION

The term gyroscope (or gyro for short) is generally applied to a flywheel rotating about its axis. The Earth, Moon and other planets that rotate about an axis also behave like gyroscopes.

It is a property of all gyroscopes that when a force is applied at right angles to the spinning axis, this will give rise to movement, not in the expected direction, but in a direction at right angles both to the spinning axis and to the applied force.

The rotational requirements of spin casting can be achieved by employing the gyroscopic stabilization provided by a balanced fly wheel supported by a lower bearing positioned below the fly wheel center of gravity a distance greater than the diameter of the fly wheel. In this configuration the rotating gyro tends to orientate its direction of spin perpendicular to the force of gravity thus holding the rotor shaft in the vertical position. Example: the toy spinning top which rises to the vertical and remains vertical until the rotational speed reduces. The vertical orientation of a constant speed gyro is thus stabilized.

Inertia is defined as the resistance of a body to a change of its state of rest or motion, a fundamental property of matter. The moment of inertia for a circular body having a radius r rotating in a plane normal to the disk through its center may be expressed as $M r^2/2$. The mass of the disk is M.

The weight of the gyro wheel and its shaft provide the preload force to center and stabilize the lower ball bearings in their races.

The spinning gyro with its shaft aligned in the vertical position resists any change however small in altitude or speed of rotation.

IN THE DRAWING

FIG. 1 shows the gyro in section.

THE PREFERRED EMBODIMENT

A circular fly wheel 7 FIG. 1 is made from a heavy metal such as iron, lead, copper or brass. A shaft 9 FIG. 1 is centered in the fly wheel 7 FIG. 1. The shaft 9 FIG. 1 extends below the fly wheel 7 FIG. 1 a distance equal or greater than the diameter of the fly wheel 7 FIG. 1. A thrust ball bearing 10 FIG. 1 supports the fly wheel 7 FIG. 1 and the shaft 9 FIG. 1. The lower ball bearing is preloaded downwardly by the weight of the fly wheel 7 FIG. 1 and its shaft 9 FIG. 1 which has a binding non-sliding fit in bearing 10 FIG. 1. The upper segment of the inner race is forced against the upper segment of ball 12 FIG. 1. The lower segment of ball 12 is forced against the lower segment of the outer race. All slack and deviation from center are thus removed by preloading. A small pulley 8 FIG. 1 is positioned close to the lower bearing. The pulley may be of the vee type, sprocket, timing belt or half round 13 FIG. 1. An upper ball bearing 14 is preloaded upwardly. Upper bearing preloading is provided through the preload collar 5 FIG. 1 resting under the inner bearing race 3 FIG. 1. Springs 6 FIG. 1 provide the upward force between the fly wheel 7 FIG. 1 and the preload collar 5 FIG. 1. The inner bearing race 3 FIG. 1 and the preload collars 5 FIG. 1 have a sliding fit to the shaft 9 FIG. 1. The preload collar forces the lower segment of the inner bearing race 3 FIG. 1 upwardly against the ball bearing 14 FIG. 1 and the upper segment of the ball bearing 14 FIG. 1 against the fixed outer bearing race 4. The upper bearing being preloaded will run true. The shaft 9 FIG. 1 having a sliding fit in the upper bearing race 3 FIG. 1 is centered in the upper bearing by friction couplings between the inner bearing race 3 FIG. 1 to the preload collar 5 FIG. 1 and the springs 6 FIG. 1 to the rotor 7 FIG. 1 and the shaft 9 FIG. 1. Movement between shaft 9 FIG. 1 and inner race 3 FIG. 1 is thus eliminated by friction coupling and dampening. A resinous mold 2 FIG. 1 having a concave optical surface 1 FIG. 1 is placed on the shaft 9 FIG. 1. The concave optical mold surface will rotate at a constant speed and vibration free. Lenses made by spin casting will have predictable and reproducible surfaces and refractive power.

It should be understood that the invention is not limited to the exact details of construction shown and described herein for obvious modifications will occur to persons skilled in the art.

We claim:

1. A method of preloading the ball bearing of a lens spin casting machine by the steps of positioning a bearing preloading collar against the inner race of the ball bearing, preloading the ball bearing by moving the preload collar toward the bearing by providing a spring force and thereby forcing both the inner ball bearing race and the ball bearings against the outer ball bearing race.

2. A method of preloading the ball bearings of a lens spin casting machine by the steps of positioning a bearing preloading collar below the inner race of the upper ball bearing, providing a rotor shaft having a sliding fit within the upper ball bearing and the preloading collar and a binding fit in the lower ball bearing, preloading the upper ball bearing by moving the preload collar upward by providing a spring force and thereby forcing both the inner ball bearing race and the ball bearings upward against the outer ball bearing race, allowing the weight of the rotor shaft to preload the lower ball bearing.

3. A method of preloading the upper ball bearing of a spin casting machine said method comprising, providing an upper and lower ball bearing and a bearing preloading collar positioned below the inner race of the upper ball bearing, providing a rotor shaft having a sliding fit within the upper ball bearing inner race and the preloading collar and a binding non-sliding fit in the lower ball bearing inner race, preloading the upper bearing by providing a spring force which moves the preload collar upward and forces the inner ball bearing race and the ball bearings upward against the outer bearing race, allowing the friction between the springs and the preloading collar to center the rotating shaft in the upper ball bearing.

* * * * *